US008543624B2

(12) United States Patent
Maeshima et al.

(10) Patent No.: US 8,543,624 B2
(45) Date of Patent: Sep. 24, 2013

(54) IMAGE PROCESSING APPARATUS

(75) Inventors: Toshiyuki Maeshima, Kiyosu (JP);
Daiki Nishioka, Toyokawa (JP);
Mitsutaka Morita, Nagoya (JP)

(73) Assignee: Konica Minolta Business Technologies, Inc. (JP)

( * ) Notice: Subject to any disclaimer, the term of this patent is extended or adjusted under 35 U.S.C. 154(b) by 205 days.

(21) Appl. No.: 12/833,897

(22) Filed: Jul. 9, 2010

(65) Prior Publication Data
US 2011/0016164 A1 Jan. 20, 2011

(30) Foreign Application Priority Data

Jul. 17, 2009 (JP) ................................. 2009-169389

(51) Int. Cl.
*G06F 17/30* (2006.01)
(52) U.S. Cl.
USPC ........................................ 707/899; 715/788
(58) Field of Classification Search
USPC ................... 715/200, 788; 707/3, 10, 674
See application file for complete search history.

(56) References Cited

U.S. PATENT DOCUMENTS

| 6,886,028 | B1* | 4/2005 | Matsuyama et al. | 709/203 |
| 7,509,569 | B2* | 3/2009 | Barrus et al. | 715/200 |
| 7,904,827 | B2* | 3/2011 | Taniguchi et al. | 715/788 |
| 2005/0237563 | A1* | 10/2005 | Yoshiura et al. | 358/1.14 |
| 2006/0184543 | A1* | 8/2006 | Fukuta | 707/10 |
| 2007/0091357 | A1* | 4/2007 | Konno et al. | 358/1.15 |
| 2008/0187345 | A1* | 8/2008 | Sorihashi | 399/83 |
| 2008/0259386 | A1* | 10/2008 | Fujino | 358/1.15 |
| 2009/0132480 | A1* | 5/2009 | Liron | 707/3 |
| 2010/0149590 | A1* | 6/2010 | Nishiyama et al. | 358/1.15 |
| 2010/0185591 | A1* | 7/2010 | Ichikawa | 707/674 |

FOREIGN PATENT DOCUMENTS

| JP | 11-234606 | 8/1999 |
| JP | 2008-205731 | 9/2008 |

* cited by examiner

*Primary Examiner* — James Trujillo
*Assistant Examiner* — Thong Vu
(74) *Attorney, Agent, or Firm* — Squire Sanders (US) LLP

(57) ABSTRACT

An image processing apparatus having: an image data inputting section; a storage section that stores image data that has been input from the inputting section; a processing section that carries out output processing of the image data; a history management section that establishes correspondence between history information of the output processing and the image data and manages the history information; a warning section; and a control section that, in response to a deleting request for the image data stored in the storage section, based on the history information of the output processing, changes a mode of the warning given out by the warning section of confirming the deleting of the image data.

18 Claims, 17 Drawing Sheets

FIG. 2

| OUTPUT JOB / INPUT JOB | A: DISPLAY | B: PRINT | C: FACSIMILE TRANSMISSION | D: NETWORK TRANSMISSION | E: SAVING IN EXTERNAL STORAGE | F: INTERNAL STORAGE |
|---|---|---|---|---|---|---|
| 1. SCAN INPUT | WARNING | OK | OK | OK | OK | WARNING |
| 2. PRINT DATA RECEPTION | OK | OK | OK | OK | OK | WARNING |
| 3. NETWORK RECEPTION | WARNING | OK | OK | OK | OK | WARNING |
| 4. FACSIMILE RECEPTION | WARNING | OK | OK | OK | OK | WARNING |
| 5. EXTERNAL STORAGE | OK | OK | OK | OK | OK | WARNING |

FIG. 3

| HISTORY NUMBER | MANAGEMENT JOB NUMBER | EXECUTION DATE | INPUT JOB | OUTPUT JOB | INPUT JOB SIMULTANEOUS PROCESSING FLAG |
|---|---|---|---|---|---|
| 1 | 163 | 2008/11/29 | *** | B: PRINT | OFF |
| 2 | 147 | 2008/10/15 | *** | B: PRINT | OFF |
| 3 | 102 | 2008/10/07 | 4: FACSIMILE RECEPTION | F: INTERNAL STORAGE | ON |
| 4 | 102 | 2008/10/07 | 4: FACSIMILE RECEPTION | D: NETWORK TRANSMISSION | ON |
| 5 | 102 | 2008/10/07 | 4: FACSIMILE RECEPTION | B: PRINT | ON |

| DECISION MAKING PRIORITY LEVEL | HISTORY CHECK CONDITION | DECISION |
|---|---|---|
| 1 | PRESCRIBED NUMBER OF DAYS HAVE PASSED SINCE THE LAST EXECUTION (LATEST IN THE HISTORY). (UNNECESSARY FILE) | OK |
| 2 | AN OUTPUT JOB WITH THE INPUT JOB SIMULTANEOUS PROCESSING FLAG BEING OFF. (NECESSARY FILE) | WARNING |
| 3 | ONLY THE OUTPUT JOBS "A: DISPLAY" AND "F: INTERNAL STORAGE" ARE PRESENT. (FILE NOT STORED EXTERNALLY) | WARNING |
| 4 | ONE OR MORE JOBS OTHER THAN "A: DISPLAY" AND "F: INTERNAL STORAGE" ARE PRESENT. (FILE ALREADY STORED EXTERNALLY) | ON |

IMAGE PROCESSING APPARATUS

This application is based on Japanese Patent Application No. 2009-169389 filed on Jul. 17, 2009 in Japanese Patent Office, the entire content of which is hereby incorporated by reference.

BACKGROUND

1. Field of the Invention

The present invention relates to image processing apparatuses that carry out the operation of deleting saved image data.

2. Description of the Related Art

In various types of image processing apparatuses that carry out processing using image data, at the time of attempting to delete image data that has been stored in that apparatus or in an external storage apparatus that is connected to it, from the point of view of data protection, there are some apparatuses that do not delete but protect the image data that has not been output to another storage apparatus or paper medium, and deletes image data that has been output while determining that there is no problem if such image data is deleted.

For example, a technology has been disclosed (see Unexamined Japanese Patent Application Publication No. Hei 11-234606) wherein, when an operation is received from the user of deleting an image data in a recording medium inside the apparatus, a warning is given out and the data is protected without deleting it if that image data has not been transferred to an external storage apparatus, and if the image data has already been transferred that image data is deleted without giving out a warning, and a technology is present (see Unexamined Japanese Patent Application Publication No. 2008-205731) wherein, when it is not possible to store new image data in an external storage apparatus connected to the apparatus because there is not enough remaining free space, the image data that has not been printed out is not deleted but is protected and only the image data that has been printed out is deleted.

In either of the above technologies, whether or not it is possible to delete an image data is decided from the presence or absence of data output, and the data is deleted without exception if it has already been output. However, sometimes a stored image data may be output again depending on the necessity (reused). Further, an image data that has been input from an external terminal or an external storage apparatus is highly likely to be remaining the source from which it was input.

In contrast with this, in the process of merely deleting without exception an image data that has been output, there is the problem that an image data that has already been output but that is highly likely to be output again and that has to be protected is deleted, or an image data that has not been output but that is highly likely to be saved in the source from where it was input is not deleted but is wastefully left to remain undeleted.

The present invention was made with the intension of solving the above problems, and an object of the present invention is to provide an image processing apparatus wherein it is possible to appropriately select the image data that can be deleted and to delete it.

SUMMARY

The aspects of the present invention for achieving the object are present in the following items.

[1] To achieve at least one of the abovementioned objects, an image processing apparatus reflecting one aspect of the present invention comprises: an image data inputting section; a storage section that stores image data that has been input from said inputting section; a processing section that carries out output processing of the image data a history management section that establishes correspondence between history information of said output processing and the image data and manages the history information; a warning section; and a control section that, in response to a deleting request for the image data stored in said storage section, based on the history information of said output processing, changes a mode of the warning given out by said warning section of confirming the deleting of the image data.

[2] The image processing apparatus of item [1], wherein said history management section also establishes correspondence between history information of said input processing by said inputting section and image data input by said image data inputting section and manages the history information and wherein said control section changes the mode of the warning given out by said warning section of confirming the deleting based on the history information of said input processing and the history information of said output processing.

[3] The image processing apparatus of item [1], wherein said control section, in response to the deleting request, makes decision as to whether or not the image data stored in said storage section satisfies a prescribed necessary storage condition based on the history information of said output processing and, for the image data satisfying this condition, gives a message that prompts a user to execute an output processing in which external storage is possible before deleting the image data.

[4] The image processing apparatus of item [3], wherein when a plurality of types of output processing can be executed the user is informed that the plurality of types of output processing can be executed.

[5] The image processing apparatus of item [1], further comprising a display section and an operation section, wherein said control section makes a decision whether or not deleting is possible based on the history information of said output processing, carries out a display of a result of the decision along with a list display of the image data stored in the storage section, and accepts operations of selecting image data to be deleted through the operation section.

[6] The image processing apparatus of item [1], wherein said control section, for the deleting request generated automatically for the image data that satisfies an execution condition set in advance, among the image data that have been stored in said storage section, determines image data that meets the prescribed automatic deleting condition to be a target of deleting and changes the prescribed automatic deleting condition for the image data that has been determined to be the target of deleting based on history information that has been established correspondence with the image data.

[7] The image processing apparatus of item [6], wherein said prescribed automatic deleting condition is that a storage period of the image data has run beyond a prescribed storage period, and wherein said control section changes the prescribed storage period as the change of the prescribed automatic deleting condition.

BRIEF DESCRIPTION OF THE DRAWINGS

FIG. 2 is a diagram showing a table of combining simultaneous operations of input jobs according to a preferred embodiment of the present invention.

FIG. 3 is a diagram showing a job history list according to a preferred embodiment of the present invention.

FIG. 4 is a diagram showing the history decision conditions list according to a preferred embodiment of the present invention.

DETAILED DESCRIPTION OF THE PREFERRED EMBODIMENT

Some preferred embodiments of the present invention are explained in the following based on the drawings.

Figure 1:
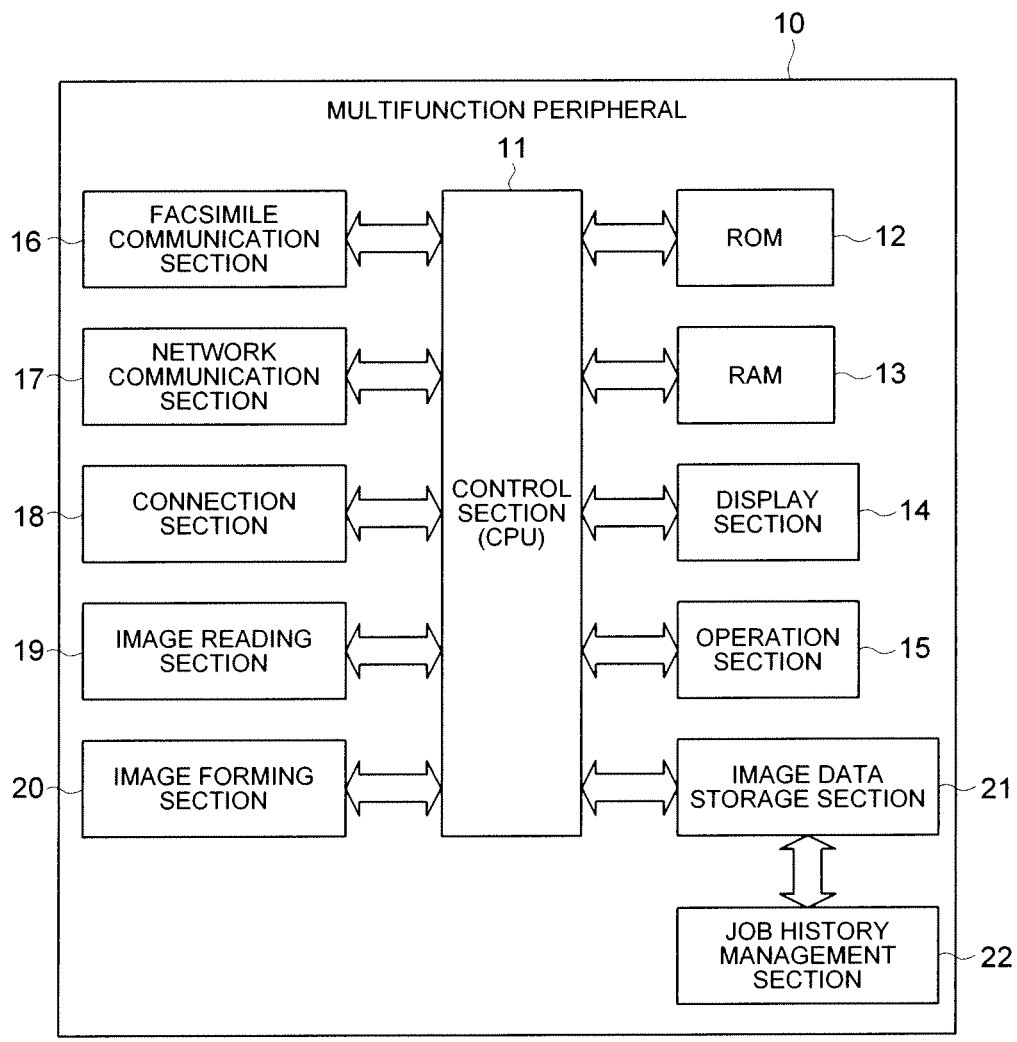
FIG. 1 is a block diagram showing the outline configuration of a multifunction peripheral as an image processing apparatus according to a preferred embodiment of the present invention.

FIG. 1 is a block diagram showing the outline configuration of a multifunction peripheral 10 as an image processing apparatus according to a preferred embodiment of the present invention.

The multifunction peripheral 10 has the copying function of optically reading an original document and printing and outputting its copy image on a recording sheet, the scanning function of saving the read out image data of the original document in a file or transmitting to an external terminal such as a server, etc., the printing function of printing and outputting on a recording sheet the image related to a print data received from an external terminal or the image related to the print data (file) stored in that multifunction peripheral 10, the facsimile function of transmitting and receiving image data via a public switched network, the network function of transmitting and receiving image data via a network, and the storage function of saving the image data that has been input, etc.

Further, the multifunction peripheral 10 is provided with the function of executing various types of processing jobs for the image data using the above functions, the function of accepting from a user the operations of settings of jobs and execution instructions, the function of managing the history of executed jobs while establishing correspondence with the image data, and for a request for deleting a stored image data, based on the job history, changing the form of warning for image data deleting confirmation, or selecting the deleting processing of image data.

The multifunction peripheral 10 is configured by connecting to a control section 11, a ROM 12 (Read Only Memory), a RAM 13 (Random Access Memory), a display section 14, an operation section 15, a facsimile communication section 16, a network communication section 17, a connection section 18, an image reading section 19, an image forming section 20, an image data storage section 21, etc. Below the image data storage section 21 is connected to a job history management section 22.

The control section 11 is constructed from a CPU (Central Processing Unit), etc., and controls the operations of the multifunction peripheral 10 according to the programs stored in the ROM 12. The ROM 12 stores various types of programs and fixed data. The RAM 13 is not only used as a working memory for temporarily storing various types of data at the time that the control section 11 executes the programs, but is also used as an image memory that temporarily stores image data.

The display section 14 is constructed from a liquid crystal display, etc., and displays various types of screens such as operation screens, settings screens, stored file deleting screens (deleting confirmation or warning screens), etc. The operation section 15 is constructed to have various types of buttons such as a mode selection button, a start button, a stop button, ten keys, etc., and a touch panel that is provided on the surface of the liquid crystal display and that detects the coordinates of the position where it is pressed, and receives the different types of operations made by the user on the multifunction peripheral 10.

The facsimile communication section 16 carries out transmission and reception of image data with an external apparatus via a public switched network. The network communication section 17 carries out communication with external terminals or servers, etc., via a network such as a LAN (Local Area Network), etc. To the connection section 18 are connected portable type storage apparatuses such as USB (Universal Serial Bus) memories, or various types of card type memories, and external storage apparatuses such as optical storage apparatuses, or disk type storage apparatuses such as hard disk type storage apparatuses.

The image reading section 19 obtains the image data by optically reading out an original document. The image reading section 19 is configured to be provided with, for example, a light source that emits light onto an original document, a line image sensor that receives the light reflected from the document and reads out one line part of the document along the width direction, a movement unit that successively moves the reading position in units of a line along the length direction of the document, an optical path that is made of lenses, mirrors, etc., and that guides the light reflected from the document to the image sensor and forms an image, and a conversion section that converts the analog image signal output by the line image sensor into digital image data, etc.

The image forming section 20 carries out the function of forming the images using an electro-photographic process on a recording sheet according to the image data and outputting it. The image forming section 20, for example, is configured to have a conveying unit for recording sheets, a photoreceptor drum, a charging unit, a laser diode (LD) whose turning on and off is controlled according to the image data that has been input, a scanning unit that scans the laser light beam emitted from the laser diode (LD) on the photoreceptor drum, a developing unit, a transfer and separating unit, a cleaning unit, and a fixing unit, as a so called laser printer carrying out image formation using an electro-photographic process. The image forming section can also be an LED printer in which the photoreceptor drum is scanned by the light from an LED (Light Emitting Diode) instead of a laser light, or can be a printer using any other method.

The image data storage section 21 is constituted from a nonvolatile memory or a hard disk apparatus, etc., and stores and saves the image data that has been input to the multifunction peripheral 10. The image data stored in the image data storage section 21 can be the image data obtained by reading the original document during scanning or copying, or the print data (image data) received from an external terminal, the image data received from the network, the image data received by facsimile reception, or the image data input from an external storage apparatus connected to the connection section 18.

The job history management section 22 stores and manages the job history list (see FIG. 3) in which is registered the history information of jobs that are used for determining whether or not deleting is possible of image data stored in the image data storage section 21. The history information of jobs is the information indicating the history of jobs (operation history) for the image data. The job history list is managed while establishing correspondence with the image data stored in the image data storage section 21.

The determination of whether or not deleting is possible of image data stored in the image data storage section 21 is also referred to in the following as the "job history check". In the present preferred embodiment, the job history check is carried out in two phases. In the first phase, the check is carried out using the above job history list and the table shown in FIG. 2. In the first phase, a decision is made as to whether or not to execute the second phase, and if the second phase is executed, the check is carried out using the above job history list and the list shown in FIG. 4.

FIG. 2 is a diagram showing the input job simultaneous operation combination table 30 that is used in the first phase of the job history check. The input job simultaneous operation combination table 30 is stored in the ROM 12 or in a nonvolatile memory not shown in the figure.

A job for an image data executed by the multifunction peripheral 10 can be classified into an input job of carrying out the image data inputting operation or the output job of carrying out the image data outputting operation. There is the case in which these input jobs and output jobs are executed by a sequence of operations (simultaneous operations) and there is the case in which only the operation of an output job is executed.

The input job simultaneous operation combination table 30 is a table in which the combinations of simultaneous operations of input jobs and output jobs are created in the form of a matrix, and the information of the decision of whether or not deleting the image data is possible is stored for each combination.

In the present example, the input jobs are—1: scan input, 2: print data reception, 3: network reception, 4: facsimile reception, and 5: external storage. Here, "external storage" implies a job of carrying out the operation of inputting the image data from an external storage apparatus.

The output jobs are—A: displaying, B: printing, C: facsimile transmission, D: network transmission, E: saving in external storage, and F: internal storage. "Display" implies a job of carrying out the output processing of making a monitor display in the display section 14 of the image data that has been input. "Saving in external storage" is the job of carrying out the output processing of storing the image data that has been input in an external storage apparatus that has been connected to the multifunction peripheral 10. "Internal storage" is the job of carrying out output processing (internal output processing) of the image data that has been input in image data storage section 21 inside the multifunction peripheral 10.

Combinations of more than one type of output job can be made for one type of input job. In other words, for a single input job, it is possible to execute one or a plurality of output jobs at the same time.

For example, the combination of scan input and display is the monitor display operation of displaying in the display section 14 the image data of the document that was input by scanning from the image reading section 19. Similarly, the combination of scan input and printing is the common copying operation of outputting by printing out in a recording sheet using the image forming section 20 the image based on the image data that has been input by scanning. The combination of scan input and facsimile transmission is similarly the common facsimile transmission operation of transmitting from the facsimile communication section 16 to an external apparatus via a public switched network the image data that has been input by scanning. Similarly, the combination of scan input and network transmission is the network transmission operation (file transmission operation) of transmitting from the network communication section 17 via a network to an external terminal or a server, etc., the image data input by scanning. The combination of scan input and saving in external storage is similarly the external storage saving operation of outputting and saving in an external storage apparatus connected to the connection section 18 the image data that has been input by scanning. Similarly, the combination of scan input and internal saving is the operation in a similar manner of saving the image data input by scanning in the image data storage section 21 inside the multifunction peripheral 10 (BOX save).

During scan input, it is possible to carry out simultaneous operation of combinations of one or more output jobs for one single input job. Although detailed explanations will be omitted, similarly, even for other input jobs, it is possible to carry out simultaneous operation of combinations of one or more output jobs for one single input job.

However, the target of the decision in the present preferred embodiment of whether or not deleting is possible (the job history check) is the image data stored in the image data storage section 21. That is, the image data that is at least stored internally at the same time as it is input.

For example, in the copying operation by the combination of scan input and printing, the image data for which internal saving was not executed simultaneously is stored in the image memory area of the RAM 13 during scan input and is deleted automatically after printing and outputting. The image data for which internal saving was executed simultaneously, after being temporarily stored in image memory area of the RAM 13 during scan input, is transferred to and saved in the image data storage section 21.

In this manner, the saving in the image data storage section 21 is not done simultaneously with inputting, after output processing, the automatically deleted image data does not become the target for the decision of whether or not to delete. Only the image data that is saved in the image data storage section 21 simultaneously with inputting becomes the target for the decision of whether or not to delete. Whether or not to save internally the image data that has been input can be selected by the apparatus settings or by the settings of the job made by the user.

The decision information is of the two types of "OK" and "Warning", and any one of these is assigned for each of the combinations of an input job and an output job. "OK" is the information indicating the decision that deleting can be made and means that there is no problem even if the image data is deleted. "Warning" is the information indicating the decision that deleting immediately is not possible and means that deleting the image data can cause problems (that caution should be exercised in deleting the image data).

The assignment of "OK" or "Warning" for each combination takes as the criterion whether the image data that is to be the target of deleting is saved externally or not (presence or absence of external saving). In more detail, the criterion is whether or not the image data that is to be the target of deleting or its image is saved in the storage apparatus or sheet medium in the output destination (destination of data transfer), or has been saved by the user (retain) of the multifunction peripheral (data retention).

In more specific terms, printing, facsimile transmission, network transmission, and saving in external storage are the output forms in which the image data or its image is saved externally, and "OK" is assigned for these. Internal storage is an output form in which the image data that has been output is stored inside the multifunction peripheral 10 and is not saved externally, and hence "Warning" is assigned for this.

For the output form of display, the scan input, network reception, and facsimile reception are assigned "Warning", and "OK" is assigned for print data reception and external storage. Scan input is carried out because it is necessary to converting the document image into data, and considering the fact that the image data of the original document is likely to be in a state different from the initial state after it has been subjected to editing or processing, etc., in the present example, "Warning" is assigned to such data. Considering that the likelihood is high in the case of print data reception that the image data is saved in the external terminal (with the user) that is the source of its transmission, "OK" has been assigned in the present example. In the case of network reception and facsimile reception, since the external apparatus that is the source of transmission is highly likely to be at a remote location, considering that it is highly likely that the image data does not remain with the user of the multifunction peripheral 10, "Warning" has been assigned in the present example. In the case of external storage, "OK" has been assigned in the present example, considering that it is highly likely that the image data is stored in the external storage apparatus (with the user) that is the source of the input.

The assignment of the above two types of decision information is one example which, for example, is made by a manufacturer of a multifunction peripheral 10 taking as the criterion (guideline) the presence or absence of external storage of the image data that is to be the target of deleting. The method of assigning the decision information need not be limited to this example, and modifications can be made suitably based on other criteria.

FIG. 3 is a diagram showing an example of the job history list 40 that is stored and managed by the job history management section 22. The job history list 40, as has been explained above, is used for the decision of whether or not an image data stored in the image data storage section 21 can be deleted, and is assigned to the stored image data. In more detail, at the time that an image data is stored in the image data storage section 21, the job history management section 22 generates and stores one job history list 40 for that image data, and manages by establishing correspondence with that image data.

This job history list 40 is a job history list that is dedicated to the image data and is prepared for each image data stored internally. The multifunction peripheral 10 is also provided with, apart from this job history list 40, the normal job history list for storing and managing the history for each job that has been executed.

In the job history list 40 is stored a history number that becomes the job identification number for the job whose history is managed in this list, a management job number that is the identification number of the job that is assigned in the history list (normal job history list) managed for each job separately from this list, the job execution data, the type of input job, the type of output job, the flag of simultaneous processing with the input job, all of which are corresponded in units of a job. The unit of job here means in units of an output job.

The flag of simultaneous processing with the input job is a flag indicating whether the input job and the output job were processed simultaneously or not. When this flag is ON, it indicates that simultaneous processing was made. If this flag is OFF, it indicates that simultaneous processing was not made. More concretely, when this flag is ON, it indicates an initial input and output job (input-output job) when the inputting of the image data was executed. When this flag is OFF, it indicates that it is a second and subsequent output job (re-output job) that is executed when a stored image data is output.

Further, the history number is assigned the number "1" for the job when an initial input-output job is executed, and every time a re-output job is executed, the numbers are assigned again sequentially from "1" starting from the new job.

In the job history list 40 of the present example, the jobs with the history numbers 3 to 5 are the initial input-output jobs. The same management job number "102" is registered, and the same date of execution of "2008/10/07" has been registered. Facsimile reception has been registered as the type of input job. The three types of output jobs processed simultaneously with the input job are, internal storage (history number 3), network transmission (history number 4), and printing (history number 5) have been registered. For this input-output job, the "ON" flag of simultaneous processing with the input job has been registered. The history of this input-output job indicates that, for the image data received by facsimile reception, the different output processings of storing in the image data storage section 21, network transmission, and printing have been carried out.

This list in which is registered the above job history information, is generated and stored along with the internal storage of the image data by the input-output job, and is managed while establishing correspondence with the image data that was stored internally. Further, at the time of generating this list, the history numbers 1 to 3 have been registered for the above initial input-output jobs.

The job with the history number 2 is the second output job for the image data that corresponds to this list. The management job number of "147" has been registered, and the execution date has been registered as "2008/10/15". Since no input job has been executed, it has not been registered, and printing has been registered as the output job.

The job with the history number 1 is the third output job for the image data that corresponds to this list. The management job number of "163" has been registered, and the execution date has been registered as "2008/11/29". Since no input job has been executed, it has not been registered, and printing has been registered as the output job.

For a re-outputting job, "OFF" is registered as the flag of simultaneous processing with the input job. The history of these two re-output jobs indicates that after the image data corresponding to this list has been input and saved, two re-outputting operations have been made by printing.

The history information of the job corresponding to the image data that has been stored in the image data storage section 21 is managed using this job history list 40. In addition, the input-output job that turns "ON" the flag of simultaneous processing with the input job in the job history list 40 becomes the target of check (target of decision) of the first phase of the job history check using the input job simultaneous processing combination table 30 explained regarding FIG. 2. Whether or not to carry out the second phase is determined depending on the result of this first phase (the details are described later).

FIG. 4 is a diagram showing the history decision conditions list 50 used in the second phase of this job history check. The history decision conditions list 50 is stored in the ROM 12 or in a nonvolatile memory not shown in the figure.

The history decision conditions list 50 is list for carrying out a decision with the same content (meaning) as that of "OK" and "Warning" described regarding FIG. 2 by comparing with the conditions (history check conditions) set in advance in the job history list 40, and the information for making that decision is stored in this list.

In this example, four history check conditions, their decision making priority level, and the decision information are stored in the history decision conditions list 50 while establishing correspondence with each history check condition.

The first history check condition of the decision making priority level is assigned the decision information of "OK" because a prescribed number of days have passed from the time that the job was executed last. Here, it is highly probable that an image data (file) that has been stored without being used for a long period is not needed since the prescribed number of days has passed from the time that the job was executed last, and considering that it can be deleted, the information "OK" has been assigned.

The second history check condition is that it is an output job with the flag of simultaneous processing with the input job being OFF, and the decision information "Warning" has been assigned to it. Here, the above flag being OFF indicates that the image data was output again, and it is highly probable that an image data that was output again is necessary, and based on the thinking that it cannot be deleted immediately, the decision information "Warning" has been assigned.

The third history check condition is that the output jobs are only "A: Display" or "F: Internal storage", and the decision information "Warning" has been assigned. Here, the image data is only displayed and stored internally but has not been stored externally, and it is highly probable that it is necessary to store it externally, and based on the thinking that it cannot be deleted immediately, the decision information "Warning" has been assigned.

The fourth history check condition is that the output jobs are one or more jobs other than "A: Display" or "F: Internal storage", and the decision information "OK" has been assigned. Here, the image data has been output to an external apparatus and is in the externally stored state, and based on the thinking that it can be deleted, the decision information "OK" has been assigned.

The above conditions and decision making priority level are, for example, an example in which the manufacturer of the multifunction peripheral 10 has determined arbitrarily or based on a subjective level of importance. The details of the conditions, their number, and the priority levels, etc., need not be restricted to the present example, and modifications can be made suitably based on other criteria.

Next, the operation of the multifunction peripheral 10 is explained below.

Figure 5:
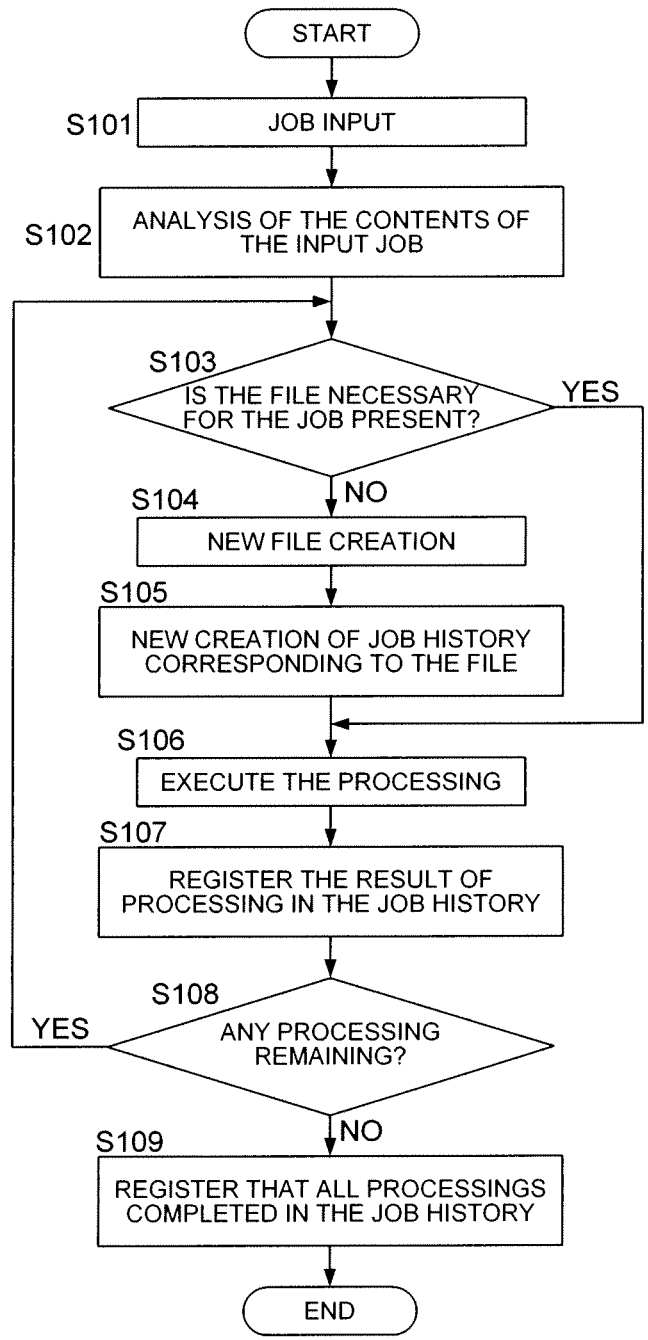
FIG. 5 is a flow chart showing the operation of job history registration by the multifunction peripheral.

FIG. 5 is a flow chart showing the operation of the job history registration by the multifunction peripheral 10. Here, the explanations are given considering that the setting has been made so as to internally store the image data that has been input. The setting of internal storage is based on the settings of the apparatus, or the settings of the job made by the user, etc. Further, explanations are given considering that the image data that are handled in various types of jobs by the multifunction peripheral 10 are files having image data.

The multifunction peripheral 10 starts this operation (Start) when it receives the input of a job. The inputting of a job is done by any one of—setting of the job and instruction of its execution by the pressing of the Start button by the user, reception of print data, network reception, and facsimile reception. The control section 11 of the multifunction peripheral 10, when a job is input (Step S101), analyzes the details of the job that has been input (Step S102).

As has been explained regarding FIG. 2, the job that has been input can be one in which the input job and output job are executed by a sequence of operations (input-output job), or can be one in which only one or more output jobs are executed (re-output job). The control section 11, in the analysis of the job that has been input, analyzes and recognizes the types and details (processing conditions) of the processings (input/output processing) present in the job, and whether or not the file (image data) necessary for the job is present.

When the file necessary for the job is not present (NO in Step S103), the control section 11 creates the file newly and stores in the image data storage section 21 (Step S104). Creating a new file is done, for example, in the cases of scan input, or facsimile reception, etc. During a scan input, the image data is input by scanning the image of an original document, and a file is created newly that has that image data (scan data). During facsimile reception, the image data of the facsimile image is received, and a file is created newly that has that image data (facsimile data). In addition, a file name is given to the newly created file. The file name, for example, is a name that indicates the type of processing such as "Copy", "Print", "Fax", etc.

The job history management section 22 creates newly a job history list 40 corresponding to the file newly stored in the image data storage section 21, and stores it while establishing correspondence with that file (Step S105). The control section 11 executes the processings of the job corresponding to that file (Step S106), and the job history management section 22 registers the job history information which the result of processing in the corresponding job history list 40 (Step S107, see FIG. 3).

When the file necessary for the job is present, that is, when either the file that is the target of processing of that job has been input or has already been stored in the image data storage section 21 (YES in Step S103), the control section 11 executes the processings of the job corresponding to that file (Step S106), and the job history management section 22 registers the job history information which the result of processing in the corresponding job history list 40 (Step S107).

The processing of the job ends at this stage when only one type of output processing is present in the job that has been input. When a plurality of types of output processings are present in the job that has been input, those plurality of output processings are executed in the executable order or in a prescribed order, and at this point, one processing will have been completed.

When any processings are remaining (YES in Step S108), the processing returns to Step S103, executing the remaining processing (S106) and registering the processing result in the job history list 40 (Step S107) are repeated until all processings have been completed.

When no processing is remaining (NO in Step S108), the job history management section 22 registers in the job history list 40 that all processings have been completed (Step S109). With this the control section 11 ends this operation (End).

The multifunction peripheral 10 carries out this operation of registering the job history every time it receives a job input. When an input-output job is executed that internally stores a new file, a job history list is created newly corresponding to that file, and the result of processing of the input-output job is registered. When a re-output job is executed that outputs a file that has been stored internally, the result of processing of the re-output job is additionally registered in the already created job history list corresponding to that file. Because of this operation, for example, a job history list 40 such as the one shown in FIG. 3 is prepared.

In the multifunction peripheral 10, since the storage capacity becomes insufficient if the saved files are accumulated in the image data storage section 21, it is necessary to appropriately delete the files that are not necessary. This deleting of stored files can be made by manual deleting due to user's operations, or by automatic deleting by automatic execution when some prescribed conditions are satisfied. In the following, the manual deleting and automatic deleting of stored files are explained in that order.

Figure 6:
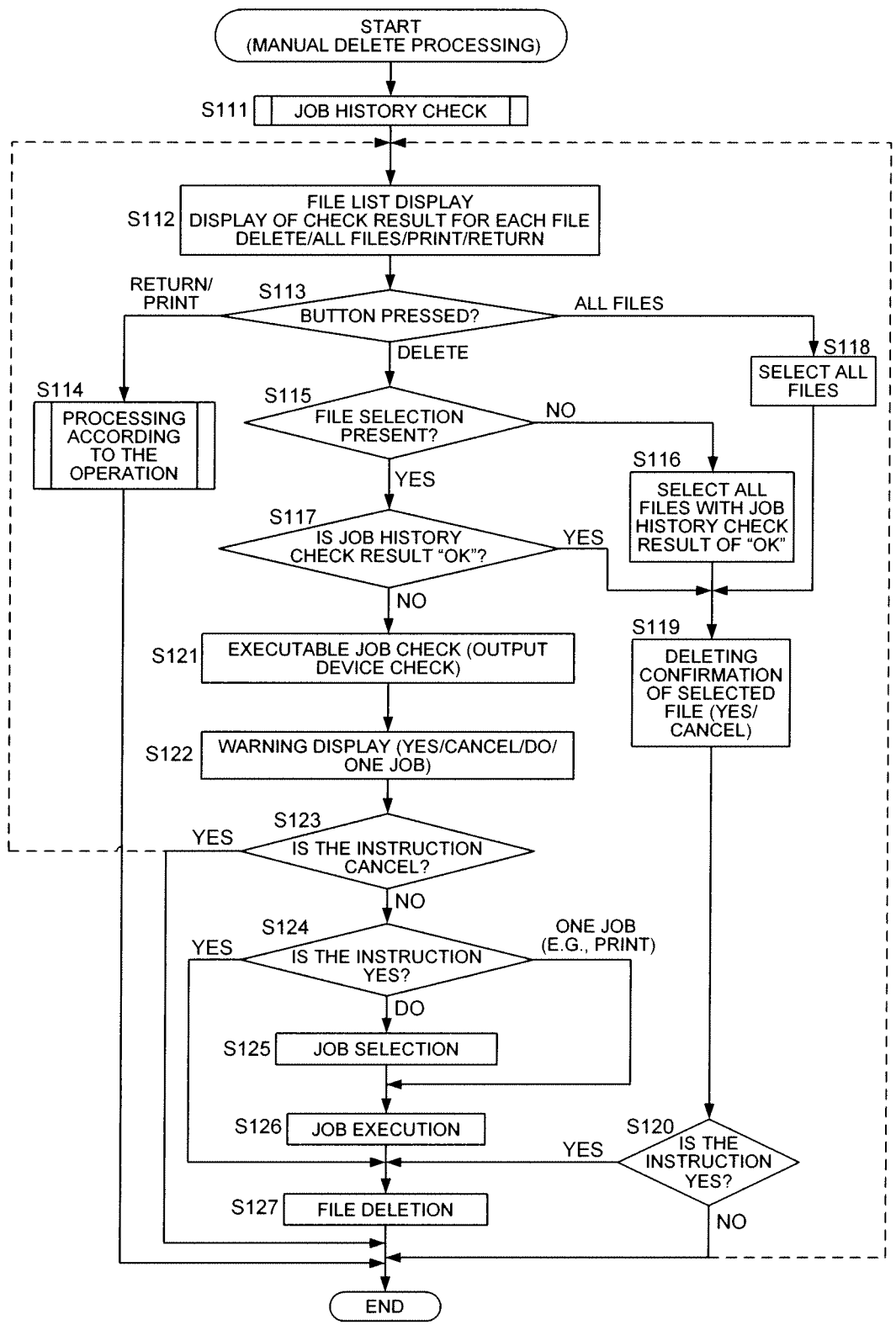
FIG. 6 is a flow chart showing the main routine of the operation for the processing of manually deleting a saved file by the multifunction peripheral.
Figure 7:
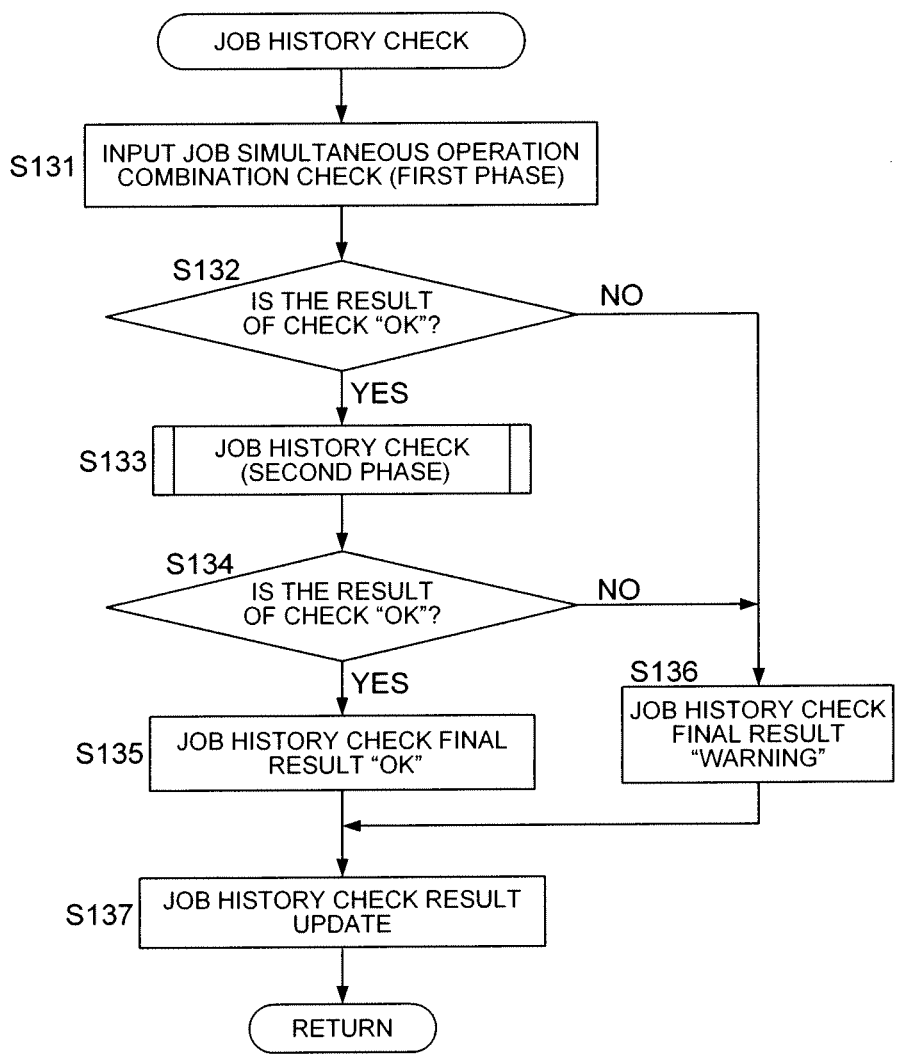
FIG. 7 is a flow chart showing the job history checking subroutine of the main routine of FIG. 6.
Figure 8:
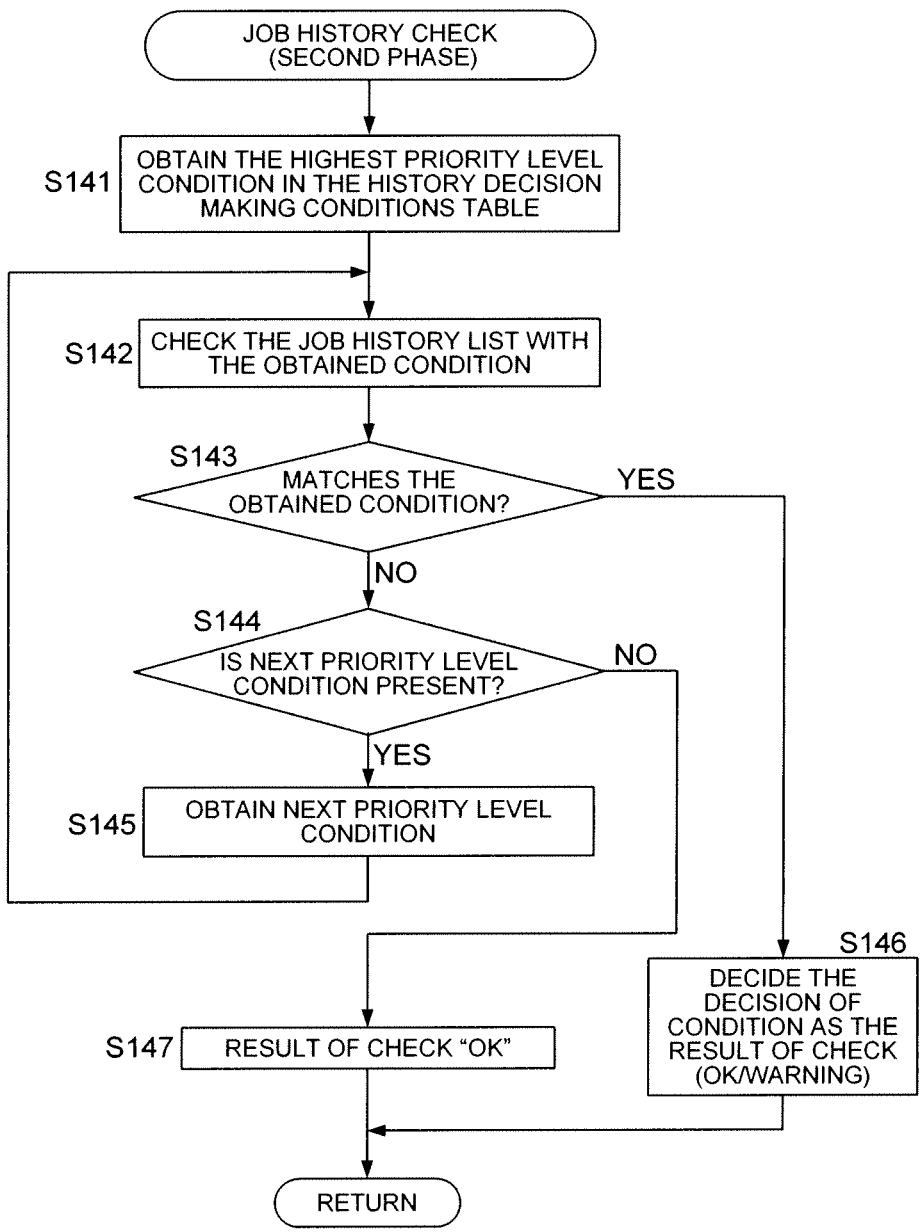
FIG. 8 is a flow chart showing the subroutine of the second phase of job history checking in the subroutine of FIG. 7.

FIG. 6 to FIG. 8 are flow charts showing the operations of the processing of manual deleting of saved files by the multifunction peripheral 10. In more detail, FIG. 6 is a flow chart showing the main routine of this operation. FIG. 7 is a flow chart showing a subroutine of the job history check, and FIG. 8 is a flow chart showing the subroutine of the second phase of the job history check. Here, each of the steps in FIG. 6 to FIG. 8 is explained according to the flow. In addition, in the main routine of FIG. 6, while examples shown in FIG. 9 to FIG. 15 of the saved file deleting screen 60 are displayed in the display section 14 of the multifunction peripheral 10, even these screens are included in the explanations.

When the control section 11 of the multifunction peripheral 10 receives the operation by the user in the operation section 15 of a request (instruction) for deleting a file (image data) stored internally, is tarts the execution of the main routine shown in FIG. 6 (Start), and executes the job history check using a subroutine (Step S111).

In the subroutine shown in FIG. 7, the control section 11 carries out the job history check explained below for all the files stored internally.

To begin with, in the first phase, for the job history list 40 explained regarding FIG. 3, a job history check is carried out using the input job simultaneous execution combination table 30 explained regarding FIG. 2 (Step S131). In more detail, in the job history list 40 corresponding to the file that is the target of the check, for all the job history entries for which the input job simultaneous processing flag is ON (combinations of input job and output job), the decision of "OK" or "Warning" is made based on the input job simultaneous execution combination table 30.

In the example of FIG. 3, the input job simultaneous processing flag is ON only for the job histories with the history numbers 3 to 5. For the job history with the history number 3, since it is a combination of facsimile reception and internal storage, the decision becomes "Warning". For the job history with the job number 4, since it is a combination of facsimile reception and network transmission, the decision becomes "OK". For the job history with the job number 5, since it is a combination of facsimile reception and printing, the decision becomes "OK".

When the results of this check are only "Warning" (NO in Step S132), the control section 11 determines the final result of the checked file as "Warning" (Step S136), and updates the job history check result of that file to "Warning" (Step S137).

When at least one of the check results is "OK" (YES in Step S132), the control section 11 executes the second phase of the job history check using a subroutine (Step S133).

In the case of the job history list 40 shown in the example of FIG. 3, since the result of job history check of three job histories for which the input job simultaneous processing flag is ON is one "Warning" and two "OK", the second phase of the job history check will be executed.

In the subroutine of the second phase shown in FIG. 8, the control section 11 carries out a job history check on the job history list 40 using the history decision making conditions list 50 descried regarding FIG. 4.

The control section 11, obtains from the history decision making conditions list 50 the history checking condition whose decision making priority level is 1 (Step S141), and checks the job history list 40 using that obtained condition (Step S142). When the content of the job history list 40 matches the obtained condition (YES in Step S143), the control section 11 determines the decision for that condition ("OK" or "Warning") to be the result of checking of the second phase (Step S146), ends this subroutine and returns to the subroutine of FIG. 7 (Return).

When the content of the job history list 40 does not match the obtained condition (NO in Step S143), the control section 11 confirms whether or not there is a history check condition with the next decision making priority level in the history decision making conditions list 50 (Step S144). When a next history checking condition is present (YES in Step S144), the control section 11 obtains that history checking condition from the history decision making conditions list 50 (Step S145), returns to Step S142 and repeats the steps from that Step in a similar manner. When a next history checking condition is not present (NO in Step S144), the control section 11 determines the result of the check of the second phase to be "OK" (Step S147), ends this subroutine, and returns to the subroutine of the first phase (Return).

For example, in the history decision making conditions list 50 shown in the example of FIG. 4, consider that the "prescribed number of days" in the history check condition with the decision making priority level of 1 has been set as "30 days (about 1 month)". When a request is made on 2008/11/30 to the multifunction peripheral 10 for deleting a file stored internally, in the job history check of the second phase for the job history list 40 shown in the example of FIG. 3, the history check condition with the decision making priority level of 1 in the history check conditions list 50 does not apply but applies to the history check condition with the decision making priority level of 2. Therefore, the result of check of the second phase will be determined to be "Warning".

In the subroutine shown in FIG. 7, when the second phase of the job history check is completed (Step S133), the control section 11 checks the result of the check of the second phase (Step S134).

When the check result of the second phase is "OK" (YES in Step S134), the control section 11 determines the final result of the checked file to be "OK" (Step S135), and updates the result of job history check of that file to "OK" (Step S137).

When the check result of the second phase is "Warning" (NO in Step S134), the control section 11 determines the final result of the checked file to be "Warning" (Step S136), and updates the result of job history check of that file to "Warning" (Step S137).

The control section 11 carries out, for all the files stored internally, the determining and updating of the check result ("OK" or "Warning") using this job history check, and when this is completed, ends this subroutine and returns to the main routine (Return).

In the main routine shown in FIG. 6, when the job history check is completed (Step S111), the control section 11 displays a list of all the files stored internally in the display section 14 (Step S112). In addition, the files in the list are displayed so that it is possible to distinguish from the result of the job history check whether or not that file can be deleted. In detailed terms, the files in the list are displayed so that it is possible to distinguish the check result "OK" that can be deleted between the check result "Warning" that cannot be deleted immediately. This list display of files, for example, is made as a stored file deleting screen 60 such as that shown in FIG. 9.

Figure 9:
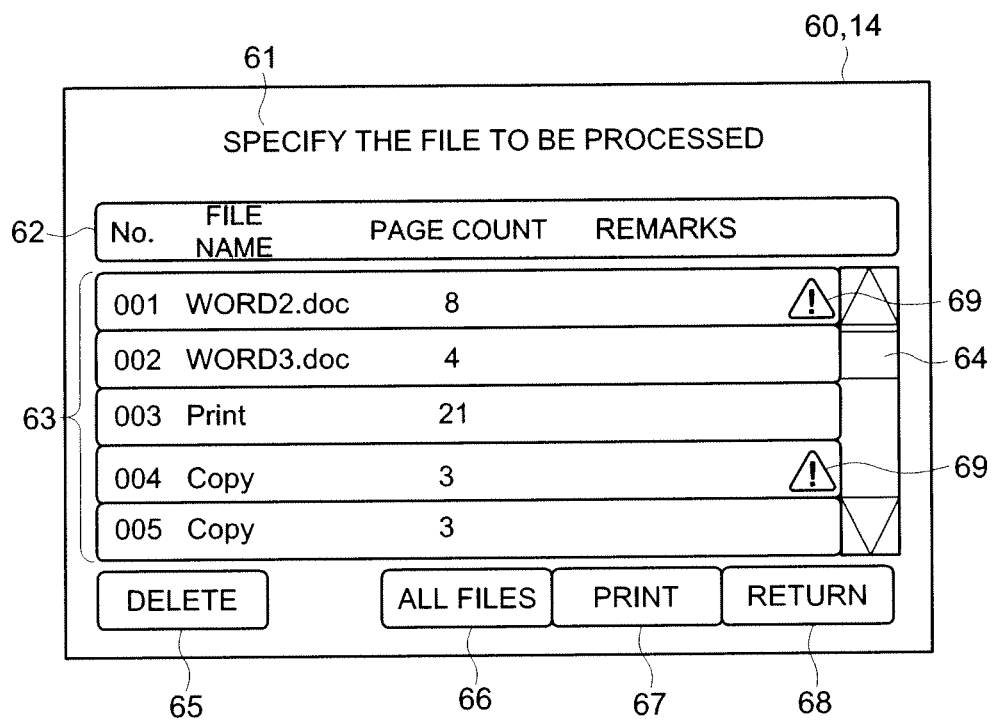
FIG. 9 is a diagram showing an example of the saved file deleting screen (saved file list display) that is displayed in the display section of the multifunction peripheral.

FIG. 9 is a diagram showing an example of the stored file deleting screen 60 (list display of the stored files) that is displayed in the display section 14. In the stored file deleting screen 60 are displayed—a message 61 prompting the user to specify (select) the target file of the processing (target file of the deleting processing or of the printing processing), parameter columns 62 in which are indicated various display parameters, a file list 63 giving a list display of the files stored internally, a scroll operation section 64 that accepts the operations of scrolling the list display of files, a Delete button 65 for receiving the confirmation of deleting, the Select All button 66 that accepts the selection of all files, a print button 67 that accepts the execution of printing, and the Back button 68 that accepts the operation of changing the displayed screen to the previous screen.

The display parameters indicated in the parameter columns 62, for example, can be "No" indicating the management serial number of the file, "File Name", "Number of pages" indicating the number of pages to be printed out, "Remarks", etc. Each of the files displayed in the file list 63 can be selected individually by the operation pressing inside the area in which they are displayed. In more detailed terms, every time a pressing operation is received, the status of the file is changed from the non-selected state to the selected state or from the selected state to the non-selected state. In addition, in the case of a file for which the result of job history check is "Warning", a warning mark 69 is displayed indicating that the file cannot be deleted immediately. The warning mark 69 is not displayed for the files for which the result of job history check is "OK".

In the stored file deleting screen 60 of the present example, list display is being made of a total of five files from No. 001 to 005, and a warning mark 69 is being displayed for the files No. 001 and No. 004.

The user, through this stored file deleting screen 60, can confirm the files stored inside the multifunction peripheral 10 along with whether or not it is possible to delete those files.

In the main routine shown in FIG. 6, when the control section 11 receives the operation of the Back button 68 or of the Print button 67 in the stored file deleting screen 60 (Back or Print in Step S113), it executes the processing according to the operation (Step S114), and ends the main routine (End).

In more detailed terms, when the pressing of the Back button 68 is received, the deleting request received from the user is cancelled, and the display screen in the display section 14 is changed from the stored file deleting screen 60 back to the previous screen. When the pressing of the Print button 67 is received after file selection has been made, the selected file is output by printing by the image forming section 20, and the display screen in the display section 14 is changed from the stored file deleting screen 60 back to the previous screen. The selection of the file that is to be the target of this printing processing can be made by individual selection by pressing the display are of the individual files, or can be by made by selecting all files (simultaneous selection) by pressing the Select All button 66.

When the pressing of the Delete button 65 in the stored file deleting screen 60 is received (Delete in Step S113), if no file selection has been made (NO in Step S115), the control section 11 selects all files for which the result of the job history check is "OK" (warning mark not displayed) (Step S116), and carries out deleting confirmation of the selected files (Step S119). The deleting confirmation in this case, for example, is carried out by making the display of a pop up deleting confirmation window 70a such as the one shown in FIG. 10.

Figure 10:
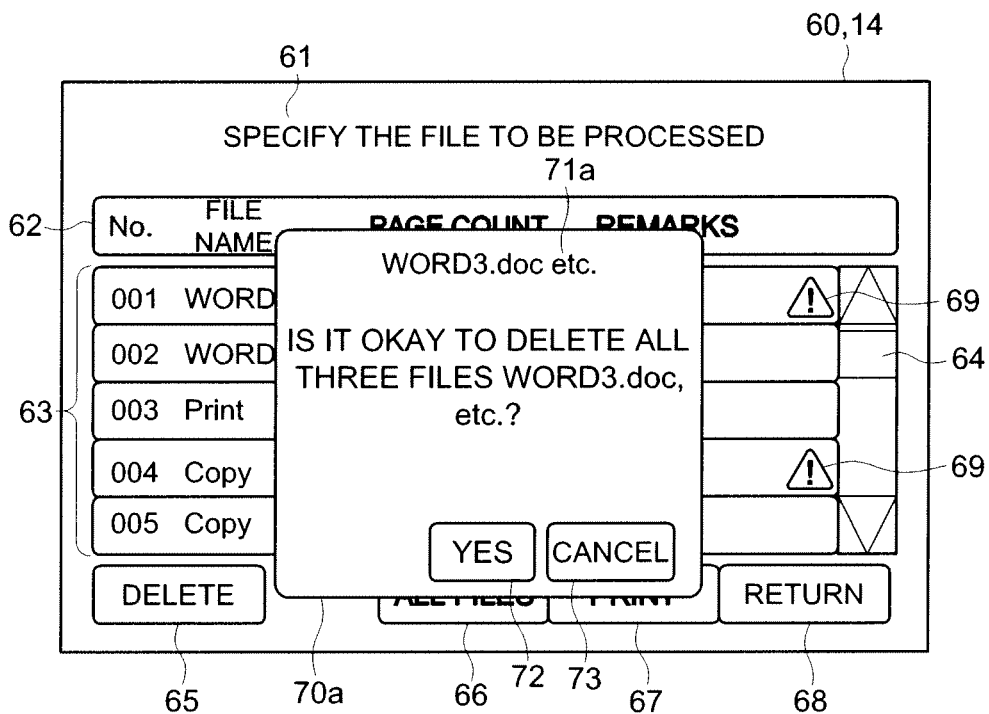
FIG. 10 is a diagram showing the state in which a pop up display is made of the deleting confirmation window upon receiving the deleting instruction without selecting the file in the saved file deleting screen of FIG. 9.

FIG. 10 is a diagram showing the condition in which a pop up display is made of a deleting confirmation window 70a when no file is selected in the stored file deleting screen 60 but a deleting instruction (deleting request) was received. In the deleting confirmation window 70a are displayed—a message 71a prompting the user to confirm the deleting of the selected file, a Yes button 72 (Execute button) receiving the execution of deleting, and a Cancel button 73 receiving the cancellation of deleting.

In the main routine shown in FIG. 6, when the control section 11 receives the pressing of the Yes button 72 in the deleting confirmation window 70a (YES in Step S120), it deletes the selected file from the image data storage section 21 (Step S127), deletes the job history list 40 of the job history management section 22 that corresponded to the deleted file, and ends this operation (End). When the pressing of the Cancel button 73 in the deleting confirmation screen 70a is received (NO in Step S120), the control section 11 cancels the deleting request received from the user, and ends this operation (End).

Further, when this canceling instruction is received, it is also possible to make the operation return to Step S112 as is shown by the broken line. In detailed terms, it is possible to erase the display of the deleting confirmation window 70a, to display the original stored file deleting screen 60, and through that screen to receive again various operations (instructions) from the user related to file deleting, etc.

When the pressing of the Delete button 65 in the stored file deleting screen 60 is received (Delete in Step S113), and a file selection has been made (YES in Step S115), the control section 11 checks the result of job history check of that selected file (Step S117). When the result of the check is "OK" (YES in Step S117 (see FIG. 11)), the control section 11 carries out deleting confirmation of the selected files (Step S119). The deleting confirmation in this case, for example, is made by making a pop up display of a deleting confirmation window 70b such as that shown in FIG. 12.

Figure 11:
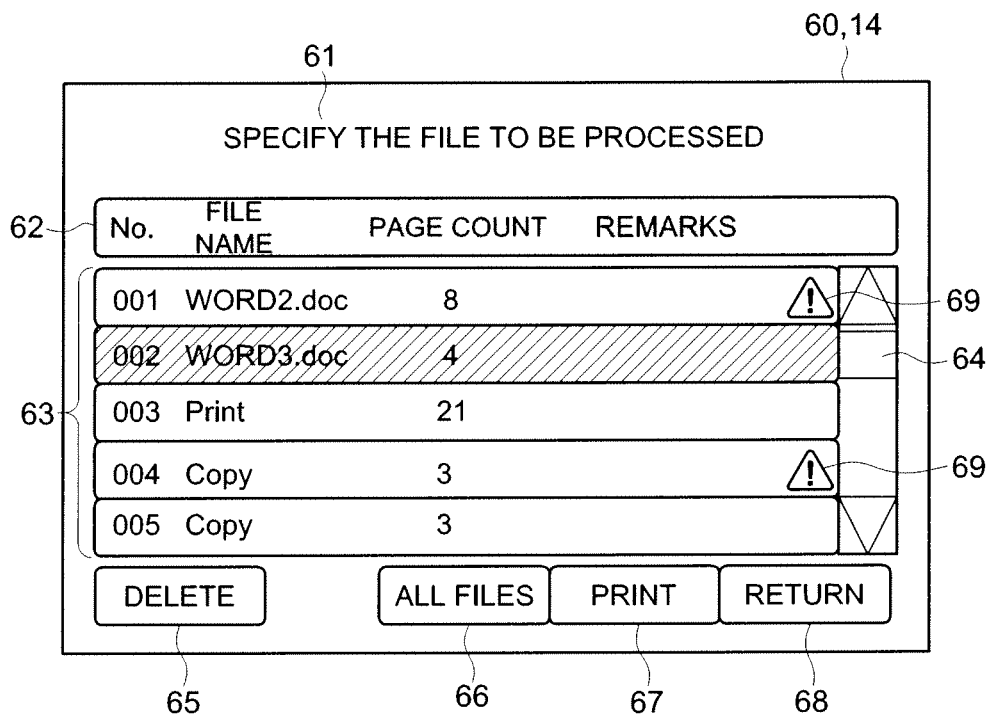
FIG. 11 is a diagram showing the state in which a file without the warning mark displayed is selected in the saved file deleting screen of FIG. 9.
Figure 12:
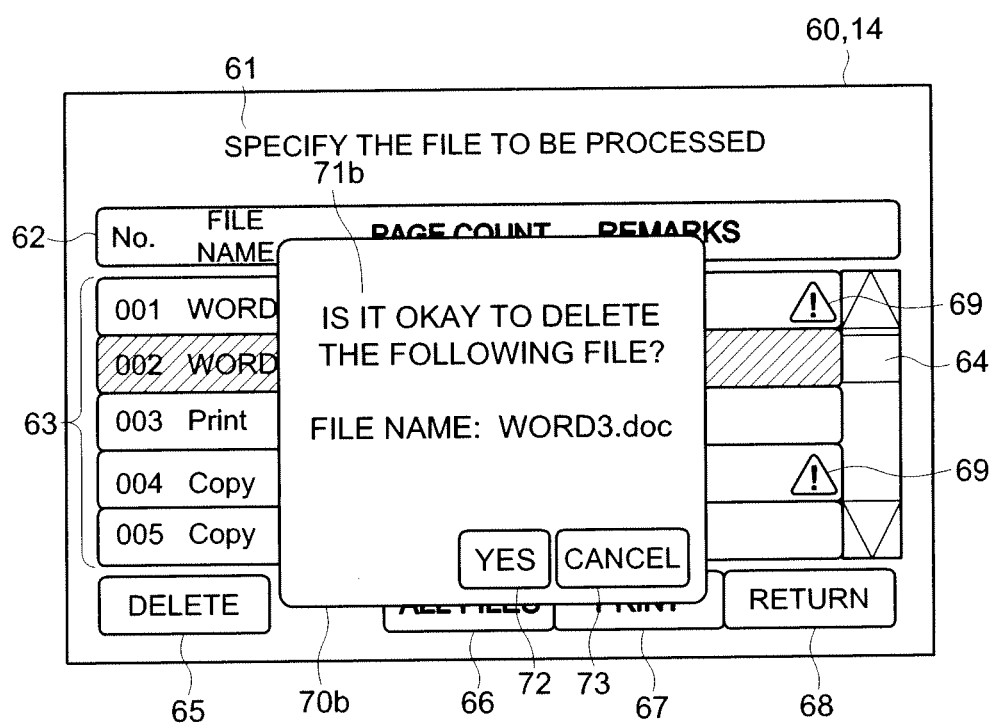
FIG. 12 is a diagram showing the state in which a popup display is made of the deleting confirmation window upon receiving the deleting instruction in the state in which a file has been selected in the saved file deleting screen of FIG. 11.

FIG. 11 is a diagram showing the state in which the file No. 002 is selected for which the result of job history check is "OK" in the stored file deleting screen 60 of FIG. 9 (warning mark not displayed). FIG. 12 is a diagram showing the state in which the Delete button 65 has been pressed in the file selection state of FIG. 11 and a pop up display has been made of the deleting confirmation window 70b in the stored file deleting screen 60.

In the deleting confirmation window 70b are displayed—a message 71b prompting the user to confirm the deleting of the selected file, a Yes button 72, and a Cancel button 73 described earlier.

In the main routine shown in FIG. 6, the control section 11 carries out operations similar to the case described earlier from the Step S119 onwards for the deleting confirmation window 70a (see FIG. 10).

Further, in the case in which the pressing of the Delete button 65 is received after the pressing of the Select All button 66 in the stored file deleting screen 60 (All Files in Step S113), the control section 11 selects all the files in the list display (Step S118), and carries out deleting confirmation of the selected files (All Files) (Step S119). Although indication has been omitted in the screen, even the deleting confirmation in this case, for example, is carried out by making a pop up display of a deleting confirmation window such as those shown in FIG. 10 or FIG. 12. Further, the processings are made from Step S119 onwards in a similar manner.

When the result of job history check of the selected file is "Warning" (NO in Step S117 (see FIG. 13)), the control section 11 checks the jobs that can be executed for that file (Step S121), and makes a warning display (Step S122).

The check of the jobs that can be executed is, for example, the processing of checking the current operating state or the current connection state of the output device that is made to operate at the time of executing the job or is connected for executing the job. Warning display is, for example, made by a pop up display of a deleting confirmation window 70c such as the one shown in FIG. 14 when there is only one type of job that can be executed. When there is a plurality of types of jobs that can be executed, the warning display is made, for example, by a pop up display of a deleting confirmation window 70d such as the one shown in FIG. 15.

Figure 13:
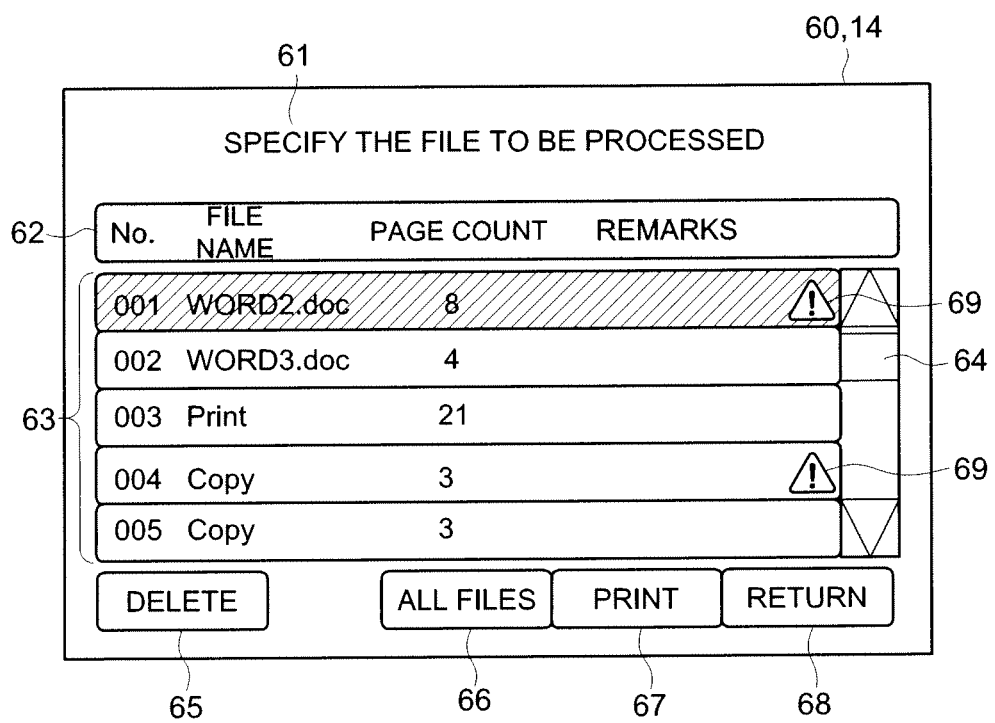
FIG. 13 is a diagram showing the state in which a file with the warning mark displayed is selected in the saved file deleting screen of FIG. 9.
Figure 14:
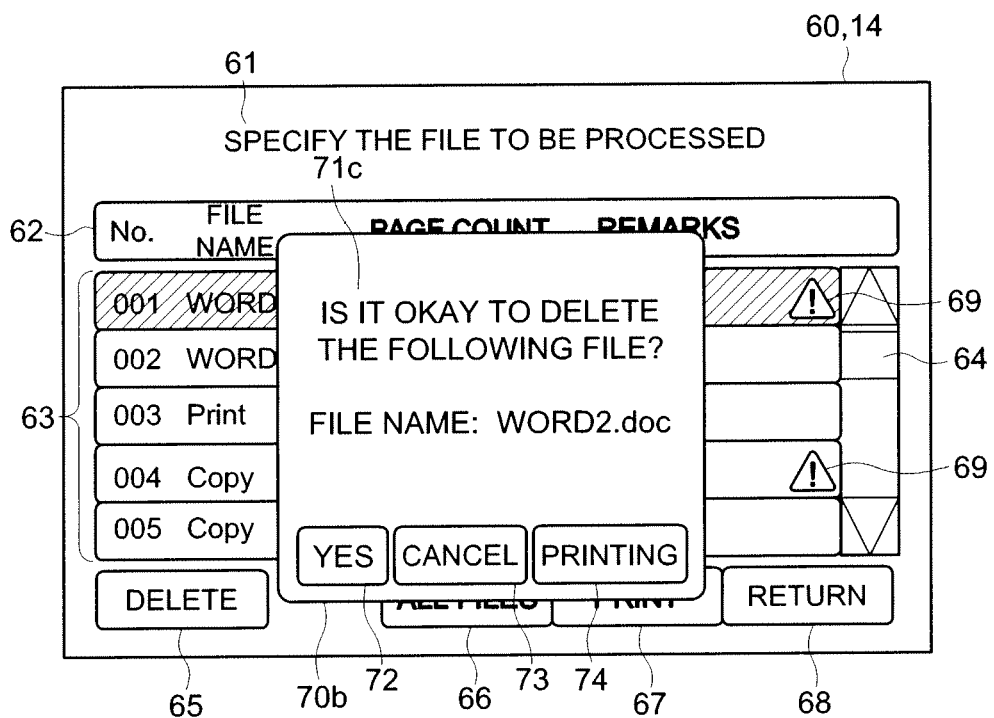
FIG. 14 is a diagram showing the state in which a pop up display is made of the deleting confirmation window upon receiving the deleting instruction in the state in which a file has been selected in FIG. 13 and when there is only one type of job that can be executed.
Figure 15:
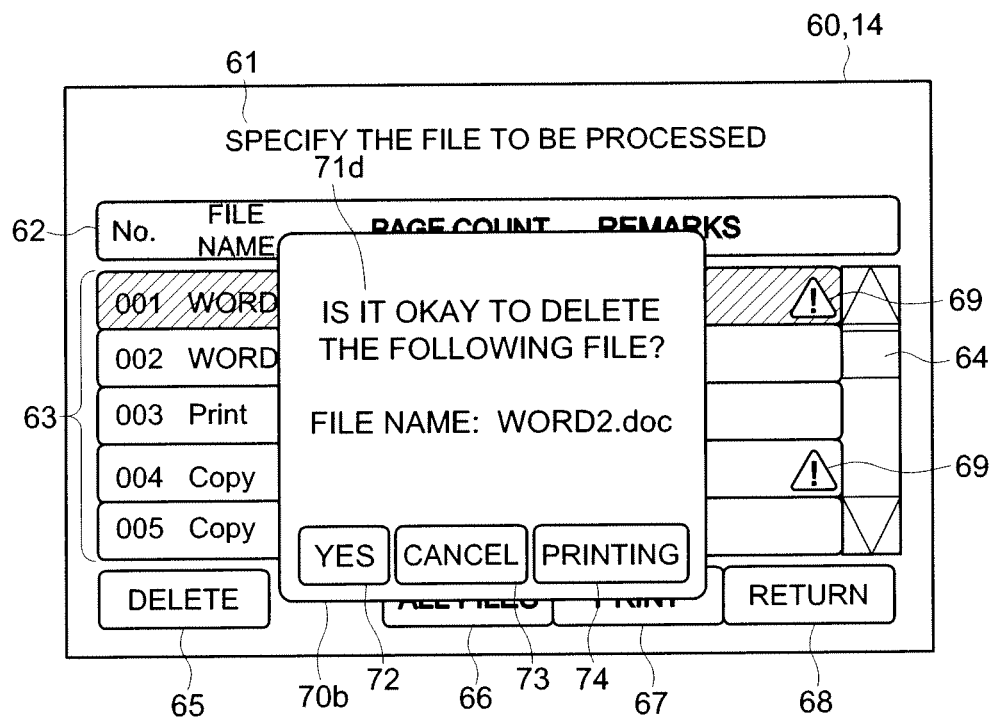
FIG. 15 is a diagram showing the state in which a pop up display is made of the deleting confirmation window upon receiving the deleting instruction in the state in which a file has been selected in FIG. 13 and when there are several types of jobs that can be executed.

FIG. 13 is a diagram showing the state in which the file No. 001 is selected for which the result of job history check is "Warning" in the stored file deleting screen 60 of FIG. 9 (warning mark displayed). FIG. 14 is a diagram showing the state in which the Delete button 65 has been pressed in the file selection state of FIG. 13 and a pop up display has been made of the deleting confirmation window 70c in the stored file deleting screen 60 when there is only one type of job that can be executed. FIG. 15 is a diagram showing the state in which the Delete button 65 has been pressed in the file selection state of FIG. 13 and a pop up display has been made of the deleting confirmation window 70d in the stored file deleting screen 60 when there is a plurality of types of jobs that can be executed.

In the deleting confirmation windows 70c or 70d are displayed—a message 71c or 71d prompting the user to confirm the deleting of the selected file, a Yes button 72, and a Cancel button 73 described earlier. In addition, a job execution button is displayed that receives the processing of executing the file deleting after executing the executable job. For example, when only a print job can be executed, the job execution button, as is shown in FIG. 14, is displayed as a Print button 74, etc., (one job). When a plurality of jobs can be executed, the job execution button, as is shown in FIG. 15, is displayed as a Do button 75, etc. The meaning of "Do" here is executing some processing (job).

When the pressing of the Do button 75 is received, the control section 11 displays in the display section 14 a menu showing a plurality of types of jobs that can be executed. This menu display, for example, is made by a pop up display of a job selection menu window 80 such as the one shown in FIG. 16.

In the job selection menu window 80 are displayed—a message 81 prompting the user to select a job, a job menu 82 in which a plurality of types of jobs that can be executed are displayed in the form of a menu, a scrolling operation section 83 for receiving the scrolling operation for the jobs displayed in the menu, an Execute button 84 for receiving the instruction of executing a job, and a Return button 85 for receiving the operation of erasing the job selection menu window 80 and returning the display screen to the previous screen.

In the job menu 82, each of the displayed jobs can be selected individually by pressing its display area. In detailed terms, every time a pressing operation is received, the status of the job is changed from the non-selected state to the selected state or from the selected state to the non-selected state. In addition, it is also possible to select a plurality of jobs at the same time.

In the present example, the job selection menu window 80 is the one that is displayed when there are five types of executable jobs—the file transmission job of attaching to an email ("Email transmission") which is included in network transmission, the print job for a file ("Print"), the facsimile transmission of a file ("Fax transmission"), the job of storing a file in a USB memory which is an external storage apparatus ("External USB storage"), and the job of file data compression ("Data compression"). These five types of jobs are displayed as a menu in the job menu 82, and the state shown in one in which the Print job has been selected.

The user, through this job selection menu window 80, can confirm a plurality of jobs that can be executed for the file that is the target of deleting, and can select and execute one or more jobs among these.

In the main routine shown in FIG. 6, when the pressing of the Cancel button 73 is received in the deleting confirmation window 70c or 70d (YES in Step S123), the control section 11 cancels the deleting request from the user and ends this operation (End).

Further, when this canceling instruction is received, it is also possible to make the operation return to Step S112 as is shown by the broken line. In detailed terms, it is possible to erase the display of the deleting confirmation window 70c or 70d, to display the original stored file deleting screen 60, and through that screen to receive again various operations (instructions) from the user related to file deleting, etc.

When the control section 11 receives the pressing of the Yes button 72 in the deleting confirmation window 70c or 70d (NO in Step S123→YES in Step S124), the control section 11 deletes the selected file from the image data storage section 21 (Step S127), deletes the job history list 40 of the job history management section 22 that corresponded to the deleted file, and ends this operation (End).

Figure 16:
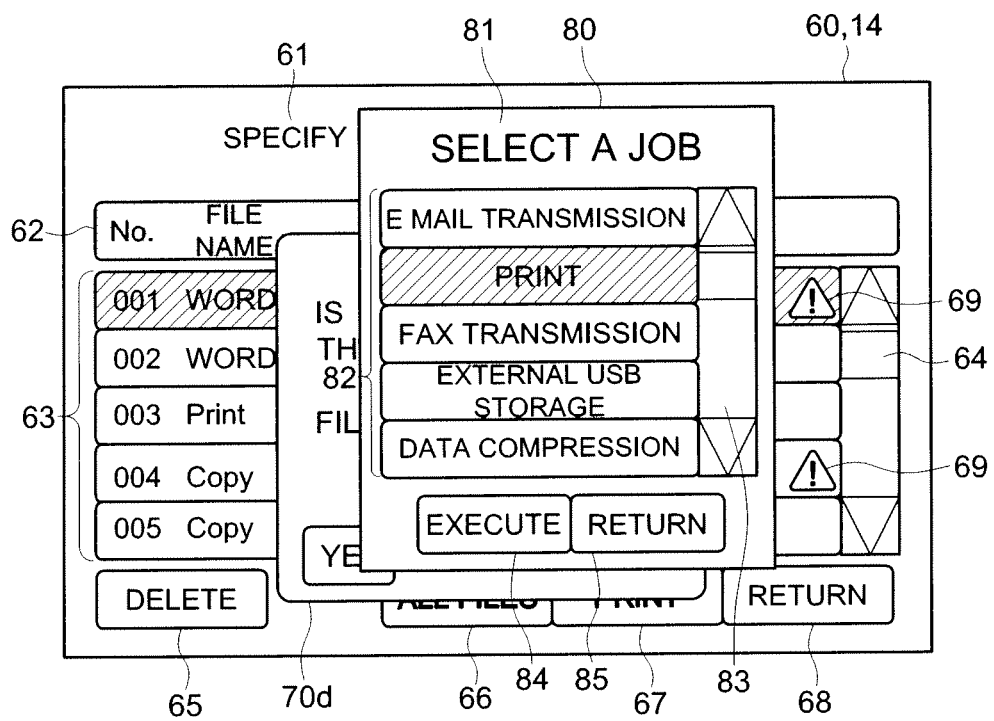
FIG. 16 is a diagram showing the state in which a pop up display is made of a job selection menu window upon receiving a deleting instruction immediately after executing the job in the deleting confirmation window of FIG. 15.

In the state in which a plurality of types of jobs can be executed, when the pressing of the job execution button (the Do button 75) is received in the deleting confirmation window 70d (Do in Step S124), the control section 11 displays the job selection menu window 80 (see FIG. 16). When the operations by the user through this job selection menu window 80 of selecting the job and pressing the execution button 84 (Step S125), the control section 11 executes that job for the selected file (Step S126). When the execution of the job is completed, the control section 11 deletes the selected file from the image data storage section 21 (Step S127), deletes the job history list 40 of the job history management section 22 that corresponded to the deleted file, and ends this operation (End).

In the state in which one type of job can be executed, when the pressing of the job execution button (the Print button 74) in the deleting confirmation window 70c is received (1 Job (e.g., Print) in Step S124), the control section 11 skips the Step S125, and executes that job (print processing) for the selected file (Step S126). When the execution of the job is completed, the control section 11 deletes the selected file from the image data storage section 21 (Step S127), deletes the job history list 40 of the job history management section 22 that corresponded to the deleted file, and ends this operation (End).

Further, in a data compression job, the processing is made of saving the compressed file and deleting the original file (replacement processing). In addition, the compressed file is taken not to be the target for the decision of whether or not deleting is possible (job history check).

Figure 17:
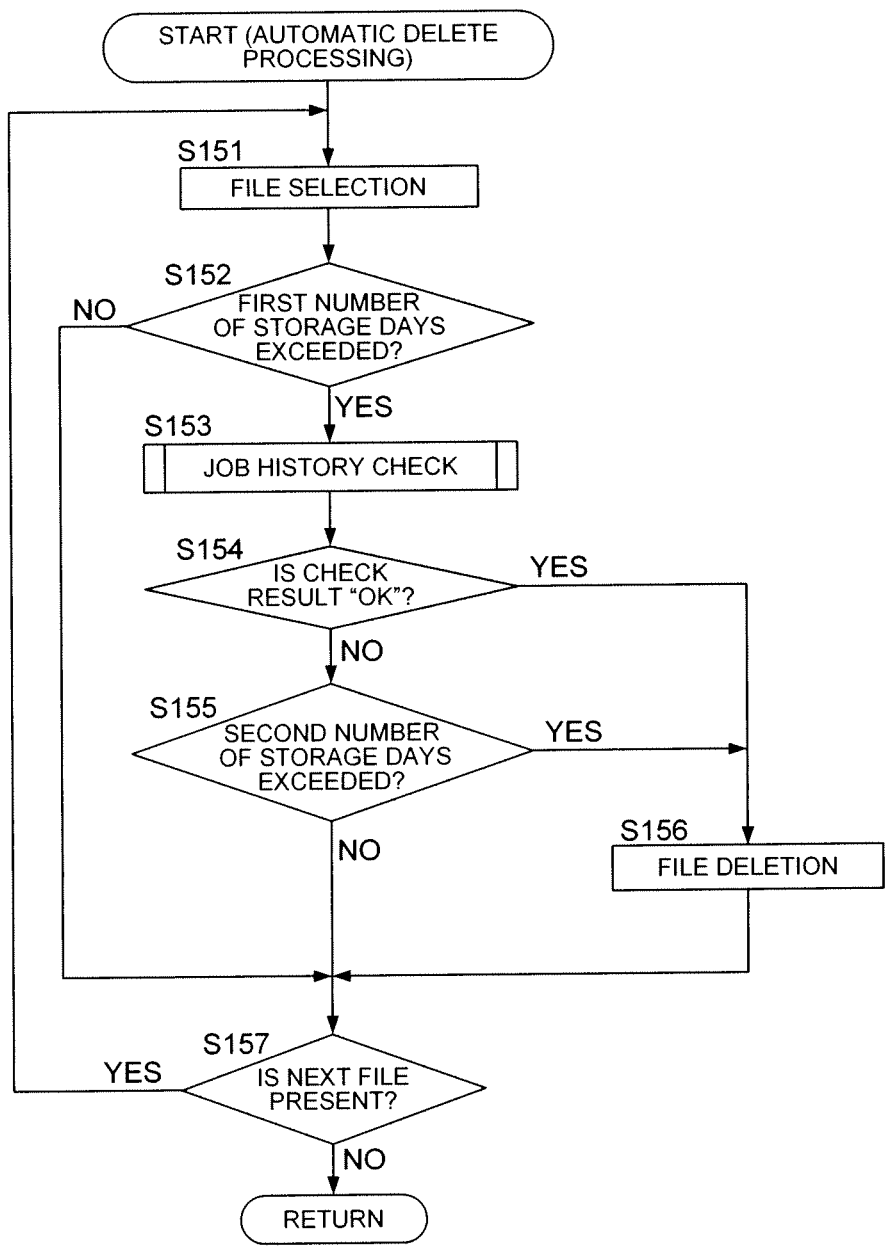
FIG. 17 is a flow chart showing the operation of the automatic file deleting processing by the multifunction peripheral.

FIG. 17 is a flow chart showing the operations of the stored file automatic deleting processing by the multifunction peripheral 10 (automatic deleting mode). In the case of this operation, when the processing start conditions set in advance are satisfied, a deleting request is generated automatically and the deleting is executed.

The processing start conditions, for example, can be a period or the remaining storage capacity of the image data storage section 21. The automatic deleting condition of stored files in the present preferred embodiment is taken to be the number of days of file storage (storage period). Here, although a stored file that has exceeded the prescribed number of storage days (a first number of storage days) is basically deleted, that prescribed number of storage days is made to be changed based on the job history information (job history list 40) of that stored file. In detailed terms, even if the number of days of storage of a stored file which is to be target of deleting has exceeded the prescribed number of days of storage (the first number of storage days), that prescribed number of days of storage will be extended (a second number of storage days) if the result of job history check for that file is "Warning". In other words, the storage is continued at least until the lapse of the number of storage days of extension provided as a grace period, and the deleting is done when even that extension number of days of storage has elapsed.

The control section 11 of the multifunction peripheral 10, when the processing start conditions set in advance are satisfied, automatically generates a deleting request and starts this operation (Start). The control section 11 selects one file that has been stored internally (Step S151), and checks the number of storage days of that file based on the date of job execution in the job history list 40 corresponding to that file. The sequence of selection of the stored files can be the sequence of their management number (No.), etc. The number of days of storage can be taken as the number of days of storage from the date of first execution of the job (the date of creation and registration of the job history list), or can be the number of days of storage from the date of last (latest) execution of the job.

When the number of days of storage of the selected file has not exceeded the first number of days of storage (NO in Step S152), the control section 11 does not delete that file but continues to store it, and checks if a next file is present or not (Step S157). When a next file is present (YES in Step S157), the processing returns to Step S151, and the control section 11 selects that file and carries out processing in a similar manner to the above from Step S152 onwards.

When the number of days of storage of the selected file has exceeded the first number of storage days set in advance (YES in Step S152), the control section 11 executes the subroutines of the job history check (first and second phases) explained regarding FIG. 7 and FIG. 8 (Step S153).

When the result of job history check is "OK" (YES in Step S154), the control section 11 deletes the selected file from the image data storage section 21 (Step S156), deletes the job history list 40 of the job history management section 22 that corresponded to the deleted file, and goes on to Step S157.

When the result of job history check is "Warning" (NO in Step S154), the control section 11, when the number of days of storage of the selected file has exceeded the second number of days of storage set in advance (YES in Step S155), deletes the selected file from the image data storage section 21 (Step S156), deletes the job history list 40 of the job history management section 22 that corresponded to the deleted file, and goes on to Step S157. When the number of days of storage of the selected file has not exceeded the second number of days of storage set in advance (NO in Step S155), the control section 11 does not delete that file but continues to store it, and checks if a next file is present (Step S157).

When a next file is present (YES in Step S157), the processing returns to Step S151, and the control section 11 selects that file and carries out processing in a similar manner to the above from Step S152 onwards. When a next file is not present (NO in Step S157), this processing is ended (End).

In this processing of automatic deleting of stored files, for the files that became the target of deleting because they satisfied the prescribed automatic deleting condition (the first number of days of storage has been exceeded) and for which the result of job history check is "Warning", the automatic deleting conditions will be relaxed. Further, the stored files that satisfy the prescribed automatic deleting conditions, depending on the result of job history check, are automatically selected for the deleting processing for each stored file.

In this manner, in a multifunction peripheral 10 according to the present preferred embodiment, for a request for deleting an image data (stored files) stored internally, based on the job history information (job history list 40) corresponding to the image data, a decision is made as to whether or not the image data can be deleted (job history check), and according to the result of this decision, either the form of deleting confirmation warning is changed, or the processing of deleting the image data is selected. In more concrete terms, the change in the form of deleting confirmation warning is changing whether or not to prompt, during the image data deleting confirmation, the user to carry out external storage of the image data (see FIG. 10, FIG. 12, FIG. 14, FIG. 15, and FIG. 16). The selection of the deleting processing not only includes changing that form of warning, but also is the selection of whether or not to make it possible to execute external storage before deleting (see, in addition, FIG. 6, etc.). Because of this, the user can select appropriately the image data that can be deleted and can delete it.

Particularly in the present preferred embodiment, because of using the history information of the input job and the history information of the output jobs as the job history information, it is possible to confirm and decide the necessity of storing the image data in detail. According to the result of this decision, it is possible to change the form of warning of deleting confirmation to a more appropriate form, and to change the deleting processing to a more appropriate deleting processing. Therefore, it is possible to select more appropriately the image data that can be deleted and to delete it.

In the decision of whether or not an image data can be deleted, based on the job history information, a decision is made as to whether or not the image data satisfies the prescribed necessary storage condition. The prescribed necessary storage condition is a condition indicating the necessity of storing the image data, and the result of job history check becoming "Warning" is such a condition (see FIG. 2 and FIG. 4).

When an instruction for deleting an image data is received from the user (the operation of pressing the Delete button 65), for the image data satisfying this condition, a message is given to the user prompting to execute an output job in which external storage is possible before deleting the image data (see FIG. 14 and FIG. 15). Upon getting this message, the user can not only confirm the image data having the necessity of being stored externally, but also can recognize that it is better to store that image data externally before deleting it. Because of this, it is possible to prevent image data requiring to be stored externally being deleted inadvertently without being stored externally.

In the external storage of image data, if a plurality of types of output jobs can be executed, the user is informed that they can be executed (see FIG. 16). Upon getting this message, the user can select any required (some or all) output jobs from among the plurality of types of output jobs that make external storing possible and can execute those jobs. Because of this, the range of selection of forms of storing image data to be stored externally becomes wide and the convenience becomes enhanced.

In the stored file deleting screen 60 that carries out a list display of the internally stored image data (stored files), the result of the decision of whether or not deleting is possible (the result of the job history check) is displayed along with the displaying or not displaying of the warning mark 69. Because of this, the user can easily distinguish (grasp) whether or not deleting is possible (presence or absence of the necessity of storing) for each individual image data displayed in the list. The user, based on the presence or absence of the necessity for storing grasped from the display or non-display of this warning mark 69, can appropriately select the image data that is to be the target of deleting and to delete it. In addition, it is possible to select at once several image data deleting of which has been judged to be possible and for which the warning mark has not been displayed by pressing the Delete button 65, and to delete all of them at once by pressing the Yes button 72 displayed in the deleting confirmation pop up window 70a. Because of this, the operations of distinguishing, selecting, and deleting the image data that can be deleted becomes easy, and the convenience is enhanced.

In the automatic deleting of internally stored image data, for the deleting request generated automatically for the image data that satisfy the execution condition set in advance, among the image data that have been stored internally, the image data that meet the prescribed automatic deleting condition become the target of deleting. In addition, the prescribed automatic deleting condition for the image data that is the target of deleting is changed based on the job history information corresponding to that image data.

As has been explained above, changes are made of relaxing the automatic deleting condition for the image data for which it has been decided based on the job history information that there is the necessity of storing the image data. In concrete terms, when the prescribed storage period of the image data is exceeded and that image data is deleted automatically, the storage period for the image data that has become the target of deleting is changed based on the job history information corresponding to that image data. The details of the change is extending the storage period for an image data for which it has been decided based on the job history information that there is a necessity for storing it (giving a grace period before deleting). In the automatic deleting of image data, by carrying out such change in the storage period (automatic deleting condition) based on the job history information, it is possible to appropriately select the image data that can be deleted and to carry out automatic deleting.

In the above, while a preferred embodiment of the present invention was explained with reference to the drawings, the concrete structure need not be restricted to that shown in the preferred embodiment, and any modifications or additions made without deviating from the scope and intent of the present inventions shall be construed to be included in the present invention.

Although in the preferred embodiment the configuration was such that the multifunction peripheral 10 manages by establishing correspondence of the history information of the input job and of the history information of the output jobs with the internally stored image data, it is also possible to have a configuration in which the management is done by establishing correspondence of one of the history information of the input job and the history information of the output job with the internally stored image data. In detailed terms, in the control of changing the form of warning in the deleting confirmation of the image data, the configuration can be such that the management is carried out by establishing correspondence of at least the history information of an output job with the internally stored image data. In the control of changing the processing of deleting the image data it is also possible to have a configuration in which the management is carried out by establishing correspondence of at least the history information of the input job with the internally stored image data.

Although the configuration is such that the creation, storing, management, and deleting, etc., of the job history information (job history list 40) corresponding to the internally stored image data is carried out by the job history management section 22, it is also possible to have a configuration in which the control section 11 using a nonvolatile memory, etc., carries out the same functions as the job history management section 22.

Although the configuration is taken here to be one in which the above job history information used in the decision of whether or not an image data can be deleted (job history check) is created as a dedicated job history list 40, it is also possible to have a configuration in which such a dedicated list is not created, but the normal job history list that stores and manages the history for each job is also used for this purpose. Although in the preferred embodiment, along with the deleting of an image data the corresponding job history list 40 is also deleted, such deleting becomes unnecessary if the normal job history list is used commonly for this purpose also. Or else, only the dedicated information that is used for the job history check, for example, the input job simultaneous processing flag, can be deleted.

In the stored file deleting screen 60 of making a list display of the image data stored internally (the stored files), although the explanations were given for the case of selecting only one image data as is shown in FIG. 11 or FIG. 13 at the time that the user selects an image data which is to be the target of deleting, it is also possible to have a configuration in which it is possible to select simultaneously any multiple number of image data for which the warning mark 69 has not been displayed, or to select simultaneously any multiple number of image data for which the warning mark 69 has been displayed. In this case, if the Delete button 65 is pressed in the state in which multiple image data have been selected simultaneously, a deleting confirmation window is displayed targeting those selected multiple image files.

Although the image data (stored files) displayed in the stored file deleting screen 60 have been displayed as soft buttons for receiving the selection and de-selection by their pressing operation, the display mode need not be restricted to this type of soft button. It is also possible to have a configuration in which the selection and de-section of the displayed image data is received by other buttons. For example, it is possible to have a configuration in which the displayed image data are selected by the operation of the cursor keys, etc., and to change their selection or de-selection by the operation of pressing a confirmation button.

Although the display of deleting confirmation or the display of job selection menu is being made by pop up windows, it is also possible to make these displays by changing the screen (screen transition).

Although the results of the decision of whether or not an image data can be deleted (the job history check) have been explained to be of only the two types (2 stages) of "OK" and "Warning", it is also possible to make them three or more (3 stages).

For example, for the "OK" decision, it is also possible to assign several ranks based on the type or the number of simultaneous executions of output jobs, etc., that can store the image data externally. For the "Warning" decision, it is possible to assign several ranks based on the history of re-use of the image data (number of times of re-use or frequency of re-use), etc. According to the multiple types (multiple stages) of results of decision due to the assigning of ranks such as these, it is possible to change the form of warning of deleting confirmation to a more appropriate form, and to change the deleting processing to a more appropriate processing. Even with such a configuration, it is possible to select and delete more appropriately image data that can be deleted.

In the automatic deleting processing of image data explained regarding FIG. 17 (automatic deleting processing of saved files), although the explanations were given taking the prescribed automatic deleting condition to be the storage period (number of days of storage), it is not necessary that the automatic deleting condition is a condition based on such temporal factors. For example, it is also possible to use conditions dependent on volume factors such as the remaining free storage capacity of the storage section that stores the image data, etc. Regarding the remaining storage capacity, it is possible to use either the value of the remaining capacity or the remaining capacity ratio.

In the automatic deleting processing taking the remaining free storage capacity as the automatic deleting condition, it is possible, for example, to set a second remaining storage capacity smaller than a first remaining storage capacity (first remaining storage capacity>second remaining storage capacity), and to relax the automatic deleting condition for the image data for which the result of decision was "Warning" in the job history check, that is, to change the automatic deleting condition from the first remaining storage capacity to the second remaining storage capacity, thereby extending the storage period (giving a grace deleting period).

Changing the automatic deleting condition need not be limited to relaxing, but can also be making it stricter. For example, it is possible to assign ranks of multiple stages as described above for the "OK" decision of the job history check, and to make changes so that the automatic deleting condition is made stricter for the image data with lower ranks. If the automatic deleting condition is taken as the storage period, it is possible to delete the image data with lower ranks after a shorter storage period than the prescribed storage period.

Further, it is also possible to combine the automatic deleting processing of image data with the control of changing the form of warning of deleting confirmation. For example, the processing start condition (execution condition) set in advance is taken to be the automatic deleting processing start instruction received from the user. When a user given an automatic deleting processing start instruction to the multifunction peripheral 10, it is also possible to make the multifunction peripheral 10 automatically select the image data that is to be the target of deleting corresponding to the automatic deleting condition, to make a list display of those selected image data in the screen, and to make the user confirm the deleting. The form of warning of deleting confirmation at this time, for example, can also be changed according to the several stages of ranks of the "OK" result of decision of the above job history check, etc.

Further, the present invention shall not be construed to be restricted to a multifunction peripheral explained in the preferred embodiment, but can also be applied to other image processing apparatuses such as copying machines, printers, facsimile machines, etc.

What is claimed is:

1. An image processing apparatus comprising:
an image data inputting section;
a storage section that stores image data that has been inputted from said inputting section;
a processing section that carries out output processing of the image data, wherein the output processing includes one or more processing selected from A) making a monitor display of the image data input from the image data inputting section, B) printing the image data input from the image data inputting section, C) executing facsimile transmission of the image data input from the image data inputting section, D) executing network transmission of the image data input from the image data inputting section, E) storing the image data input from the image data inputting section in an external storage apparatus, and F) storing the image data input from the image data inputting section in the storage section;
a history management section that establishes correspondence between history information of said output processing and the image data and manages the history information;
a warning section to provide different modes of warning of confirming the deleting of the image data; and
a control section that, in response to a deleting request for the image data stored in said storage section, based on the history information of said output processing, selects one of the modes of the warning given out by said warning section of confirming the deleting of the image data.

2. The image processing apparatus of claim 1, wherein said history management section also establishes correspondence between history information of input processing by said inputting section and the image data input by said image data inputting section and manages the history information and wherein said control section selects one of the modes of the warning given out by said warning section of confirming the deleting based on the history information of said input processing and the history information of said output processing.

3. The image processing apparatus of claim 1, wherein said control section, in response to the deleting request, makes a decision as to whether or not the image data stored in said storage section satisfies a prescribed necessary storage condition based on the history information of said output processing and, for the image data satisfying this condition, gives a message that prompts a user to execute an output processing in which external storage is possible before deleting the image data.

4. The image processing apparatus of claim 3, wherein when a plurality of types of output processing can be executed the user is informed that the plurality of types of output processing can be executed.

5. The image processing apparatus of claim 1, further comprising a display section and an operation section, wherein said control section makes a decision whether or not deleting is possible based on the history information of said output processing, carries out a display of a result of the decision along with a list display of the image data stored in the storage section, and accepts operations of selecting image data to be deleted through the operation section.

6. The image processing apparatus of claim 1, wherein said control section, for the deleting request generated automatically for the image data that satisfies an execution condition set in advance, among the image data that have been stored in said storage section, determines image data that meets the prescribed automatic deleting condition to be a target of deleting and changes the prescribed automatic deleting condition for the image data that has been determined to be the target of deleting based on history information that has been established correspondence with the image data.

7. The image processing apparatus of claim 6, wherein said prescribed automatic deleting condition is that a storage period of the image data has run beyond a prescribed storage period, and wherein said control section changes the prescribed storage period as the change of the prescribed automatic deleting condition.

8. The image processing apparatus of claim 1, wherein
said processing section is configured to carry out a plurality of output processing types selected from any of A), B), C), D), E) and F);
said history information includes output history information indicating which one or more of said output processing types was performed previously for said image data; and
said control section selects, based on said output history information, said mode of warning from among said different modes of warning.

9. The image processing apparatus of claim 8, wherein:
said image inputting section is configured to carry out a plurality of input processing types selected from any of 1) scan input, 2) print data reception, 3) network reception, 4) facsimile reception, and 5) carrying out an operation of inputting image data from an external storage apparatus that has been connected to the image processing apparatus;
said history management section includes a table of correspondence between said different modes of warning and different combinations of said output processing types and said input processing types;
said history information includes a combination of said output history information and input history information indicating which of said input processing types was performed previously by said inputting section for said image data; and
said control section selects, from said table, said mode of warning that corresponds to said combination of said output history information and said input history information.

10. An image processing apparatus comprising:
an image data inputting section;
a storage section that stores image data that has been inputted from said inputting section;
a history management section that establishes correspondence between history information of input processing at said inputting section and the image data and manages the history information, wherein the input processing at the inputting section includes one or more processes selected from 1) scan input, 2) print data reception, 3) network reception, 4) facsimile reception, and 5) carrying out an operation of inputting image data from an external storage apparatus that has been connected to the image processing apparatus; and
a control section that, in response to a deleting request for the image data stored in said storage section, changes a deleting processing of the image data based on the history information of the input processing and selects a mode of warning from among different modes of warning of confirming the deleting of the image data.

11. The image processing apparatus of claim 10, further comprising: a processing section that carries out output processing of the image data, wherein said history management section also establishes correspondence between history information of said output processing by said processing section and the image data output by said processing section and manages the history information and wherein said control section changes the deleting processing of the image data based on the history information of said input processing and the history information of said output processing.

12. The image processing apparatus of claim 11, wherein:
said image inputting section is configured to carry out a plurality of input processing types selected from any of 1), 2), 3), 4), and 5);
said history information for said image data includes input history information indicating which of said input processing types was performed previously by said inputting section for said image data; and
said control section selects, based on said input history information, said mode of warning from among said different modes of warning.

13. The image processing apparatus of claim 12, wherein:
said processing section is configured to carry out a plurality of output processing types selected from any of A) making a monitor display of the image data input from the image data inputting section, B) printing the image data input from the image data inputting section, C) executing facsimile transmission of the image data input from the image data inputting section, D) executing network transmission of the image data input from the image data inputting section, E) storing the image data input from the image data inputting section in an external storage apparatus, and F) storing the image data input from the image data inputting section in the storage section;
said history management section includes a table of correspondence between said different modes of warning and different combinations of said output processing types and said input processing types;
said history information includes a combination of said input history information and output history information indicating which one or more of said output processing types was performed previously for said image data; and
said control section selects, from said table, said mode of warning that corresponds to said combination of said input history information and said output history information.

14. The image processing apparatus of claim 10, wherein said control section, in response to the deleting request, makes decision as to whether or not the image data stored in said storage section satisfies a prescribed necessary storage condition based on the history information of said output processing and, for the image data satisfying this condition, gives a message that prompts a user to execute an output processing in which external storage is possible before deleting the image data.

15. The image processing apparatus of claim 14, wherein when a plurality of types of output processing can be executed the user is informed that the plurality of types of output processing can be executed.

16. The image processing apparatus of claim 10, further comprising a display section and an operation section, wherein said control section makes a decision whether or not deleting is possible based on the history information of said output processing, carries out a display of a result of the decision along with a list display of the image data stored in the storage section, and accepts operations of selecting image data to be deleted through the operation section.

17. The image processing apparatus of claim 10, wherein said control section, for the deleting request generated automatically for the image data that satisfies an execution condition set in advance, among the image data that have been stored in said storage section, determines image data that meets the prescribed automatic deleting condition to be a target of deleting and changes the prescribed automatic deleting condition for the image data that has been determined to be the target of deleting based on history information that has been established correspondence with the image data.

18. The image processing apparatus of claim 17, wherein said prescribed automatic deleting condition is that a storage period of the image data has run beyond a prescribed storage period, and wherein said control section changes the prescribed storage period as the change of the prescribed automatic deleting condition.

* * * * *